(12) United States Patent
Lee et al.

(10) Patent No.: US 8,050,823 B2
(45) Date of Patent: Nov. 1, 2011

(54) METHOD AND APPARATUS FOR CONTROLLING LATERAL STABILITY OF VEHICLE

(75) Inventors: Joong Ryoul Lee, Yongin-Si (KR); Dong Ho Shin, Yongin-Si (KR)

(73) Assignee: Hyundai Motor Company, Seoul (KR)

( * ) Notice: Subject to any disclaimer, the term of this patent is extended or adjusted under 35 U.S.C. 154(b) by 393 days.

(21) Appl. No.: 12/220,817

(22) Filed: Jul. 29, 2008

(65) Prior Publication Data
US 2009/0157262 A1    Jun. 18, 2009

(30) Foreign Application Priority Data
Dec. 12, 2007   (KR) .................... 10-2007-0129287

(51) Int. Cl.
*B62D 6/00* (2006.01)
(52) U.S. Cl. ............. 701/42; 701/41; 180/421; 180/422
(58) Field of Classification Search .............. 701/42, 701/41, 48, 1; 180/421, 422, 402, 415
See application file for complete search history.

(56) References Cited

U.S. PATENT DOCUMENTS

| | | | | |
|---|---|---|---|---|
| 4,720,790 A * | 1/1988 | Miki et al. ...................... | 701/41 |
| 4,874,183 A * | 10/1989 | Chikuma et al. .............. | 180/415 |
| 5,236,337 A * | 8/1993 | Kikuchi et al. ................. | 177/52 |
| 5,524,079 A * | 6/1996 | Ishida et al. .................... | 701/42 |
| 5,957,987 A * | 9/1999 | Sudo et al. ...................... | 701/41 |
| 6,438,474 B1 * | 8/2002 | Tanaka et al. ................... | 701/41 |
| 6,449,543 B2 * | 9/2002 | Nishizaki et al. ............... | 701/41 |
| 6,571,160 B2 * | 5/2003 | Akita .............................. | 701/42 |
| 2008/0015754 A1 * | 1/2008 | Hac ................................ | 701/48 |
| 2008/0086248 A1 * | 4/2008 | Lu et al. ......................... | 701/41 |
| 2009/0276124 A1 * | 11/2009 | Suzumura et al. .............. | 701/42 |
| 2010/0174463 A1 * | 7/2010 | Uragami et al. ................ | 701/70 |

* cited by examiner

*Primary Examiner* — Thomas Black
*Assistant Examiner* — Marthe Marc-Coleman
(74) *Attorney, Agent, or Firm* — Edwards Angell Palmer & Dodge LLP; Peter F. Corless

(57) ABSTRACT

The present apparatus stabilizes the behavior of the vehicle when a lateral disturbance occurs and includes a lateral disturbance detection unit, a target yaw rate computation unit and a vehicle yaw rate control unit. The lateral disturbance detection unit detects a lateral disturbance. The target yaw rate computation unit calculates a driver's steering angle when the lateral disturbance is detected, and calculates a target yaw rate using the calculated driver's steering angle, and vehicle information, including vehicle behavior information and vehicle specification information. The vehicle yaw rate control unit controls a vehicle yaw rate so as to attenuate a turning moment attributable to the lateral disturbance, thereby causing the controlled vehicle yaw rate to converge on the calculated target yaw rate.

12 Claims, 5 Drawing Sheets

METHOD AND APPARATUS FOR CONTROLLING LATERAL STABILITY OF VEHICLE

CROSS-REFERENCE TO RELATED APPLICATIONS

This application claims priority under 35 U.S.C. §119(a) to Korean Application No. 10-2007-0129287, filed on Dec. 12, 2007, the disclosure of which is incorporated herein by reference in its entirety.

BACKGROUND

1. Technical Field

The present invention relates to a method and apparatus for controlling the lateral stability of a vehicle, which controls the yaw rate of the vehicle so as to attenuate a turning moment attributable to an external disturbance applied laterally to the vehicle, thereby preventing the vehicle from deviating from driving lane and preventing a traffic accident.

2. Background Art

Many control technologies for vehicle safety have been developed, such as Advanced Safety Vehicle (ASV) technology for the stable traveling of a vehicle.

Such control technologies, such as ASV technology, are control technologies that employ a method of performing control intervention for straight roads for which a driver's intention to steer a vehicle is low, and performing no control intervention and handing over control to the driver for curved roads for which the driver's intention to steer the vehicle is high.

However, when a lateral disturbance such as side wind is abruptly applied to a vehicle while the vehicle is traveling along a curved road, a turning moment is generated due to the yaw component by the lateral disturbance. Control technologies for vehicle safety have problems in that they do not provide appropriate control or measures for counteracting such a lateral disturbance, so that drivers move off of roads along which they intend to travel, and thus serious traffic accidents may occur.

The above information disclosed in this the Background section is only for enhancement of understanding of the background of the invention and therefore it may contain information that does not form the prior art that is already known in this country to a person of ordinary skill in the art.

SUMMARY OF DISCLOSURE

In one aspect, the present invention provides a method and apparatus for controlling the lateral stability of a vehicle, which controls the yaw rate of the vehicle so as to attenuate a turning moment attributable to a lateral disturbance when the lateral disturbance occurs, thereby preventing the vehicle from moving off of a road and minimizing the occurrence and danger of a traffic accident.

In a more particular aspect, the invention provides an apparatus for controlling lateral stability of a vehicle, the apparatus stabilizing behavior of the vehicle when a lateral disturbance occurs. The apparatus featured in certain preferred aspects of the invention comprises a lateral disturbance detection unit for detecting a lateral disturbance, a target yaw rate computation unit for calculating a driver's steering angle when the lateral disturbance is detected, and a vehicle yaw rate control unit for controlling a vehicle yaw rate so as to attenuate a turning moment attributable to the lateral disturbance, thereby causing the controlled vehicle yaw rate to converge on the calculated target yaw rate.

In certain embodiments, The present invention provides an apparatus for controlling the lateral stability of a vehicle, the apparatus stabilizing the behavior of the vehicle when a lateral disturbance occurs, including a lateral disturbance detection unit for detecting a lateral disturbance; a target yaw rate computation unit for calculating a driver's steering angle when the lateral disturbance is detected, and calculating a target yaw rate using the calculated driver's steering angle, and vehicle information, including vehicle behavior information and vehicle specification information; and a vehicle yaw rate control unit for controlling a vehicle yaw rate so as to attenuate a turning moment attributable to the lateral disturbance, thereby causing the controlled vehicle yaw rate to converge on the calculated target yaw rate.

Additionally, in exemplary embodiments, the present invention provides a method of controlling the lateral stability of a vehicle, the method stabilizing the behavior of the vehicle when a lateral disturbance occurs, including (a) a lateral disturbance detection step of detecting a lateral disturbance; (b) a target yaw rate computation step of calculating a driver's steering angle when the lateral disturbance is detected, and calculating a target yaw rate using the calculated driver's steering angle, and vehicle information, including vehicle behavior information and vehicle specification information; and (c) a vehicle yaw rate control step of controlling a vehicle yaw rate so as to attenuate a turning moment attributable to the lateral disturbance, thereby causing the controlled vehicle yaw rate to converge on the calculated target yaw rate.

The invention includes a motor vehicle comprising an apparatus for controlling lateral stability of a vehicle as described herein.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
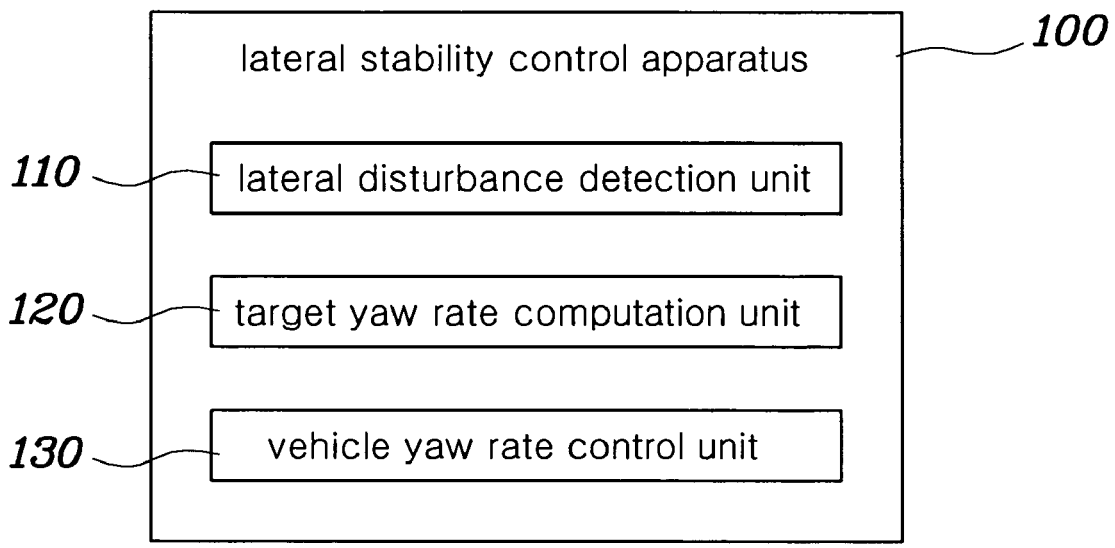
FIG. 1 is a block diagram of an apparatus for controlling lateral stability according to the present invention.

As described herein, the present invention features an apparatus for controlling lateral stability of a vehicle, the apparatus stabilizing behavior of the vehicle when a lateral disturbance occurs, comprising a lateral disturbance detection unit for detecting a lateral disturbance, a target yaw rate computation unit for calculating a driver's steering angle when the lateral disturbance is detected, and a vehicle yaw rate control unit for controlling a vehicle yaw rate so as to attenuate a turning moment attributable to the lateral disturbance, thereby causing the controlled vehicle yaw rate to converge on the calculated target yaw rate.

In certain preferred embodiments of the invention, a target yaw rate is calculated using the calculated drivers steering angle, and vehicle information, including vehicle behavior information and vehicle specification information. In other preferred embodiments of the invention, the lateral disturbance detection unit detects the lateral disturbance using a yaw rate sensor. In other certain preferred embodiments, the target yaw rate computation unit calculates the driver's steering angle using a steering angle sensor.

In other embodiments, the invention includes a method for controlling the lateral stability of a vehicle comprising detecting a lateral disturbance of a vehicle, calculating a steering angle, and controlling the yaw rate, thereby controlling the lateral stability of a vehicle. The method can be performed according to any of the embodiments as described herein.

The invention can also include a motor vehicle comprising the apparatus for controlling lateral stability of a vehicle as described herein.

Reference now should be made to the drawings, in which the same reference numerals are used throughout the different drawings to designate the same or similar components.

Embodiments of the present invention will be described in detail with reference to the accompanying drawings.

FIG. 1 is a block diagram of an apparatus for controlling lateral stability according to certain preferred embodiments of the present invention.

As shown in FIG. 1, a lateral stability control apparatus 100 for stabilizing the behavior of a vehicle when a lateral disturbance occurs in a traveling vehicle may suitably include a lateral disturbance detection unit 110, a target yaw rate computation unit 120, and a vehicle yaw rate control unit 130. In further embodiments, the lateral stability control apparatus 100 may suitably include a steering angle sensor for detecting a steering angle and a yaw rate sensor for detecting a yaw rate.

According to preferred embodiments, the lateral disturbance detection unit 110 detects a lateral disturbance. This detection is performed using the yaw rate sensor.

When a lateral disturbance is detected, the target yaw rate computation unit 120 calculates a drivers steering angle, and calculates a target yaw rate using the calculated driver's steering angle, and vehicle information, including, but not limited to, vehicle behavior information and vehicle specification information.

The vehicle yaw rate control unit 130 controls the vehicle yaw rate so that a turning moment, generated by the lateral disturbance suitably detected by the lateral disturbance detection unit 110, is attenuated, and causes the controlled vehicle yaw rate to converge on the target yaw rate previously calculated by the target yaw rate computation unit 120.

The target yaw rate computation unit 120 suitably calculates the above-described driver's steering angle using the steering angle sensor.

The target yaw rate computation unit 120 may suitably calculate the driver's steering angle by extracting a number of steering angles equal to the number of samples, measured before the time point at which the lateral disturbance was detected by the lateral disturbance detection unit 110, at intervals of sampling periods, and suitably calculating the average of the number of steering angles equal to the number of samples. Accordingly, if the sampling period is 10 seconds, the number of samples is 5 and the lateral disturbance detection unit 110 detects a lateral disturbance at a time point of 50 seconds, a reference detection time point is the time point of 50 seconds, and the target yaw rate computation unit 120 suitably receives steering angles at 0 seconds, 10 seconds, 20 seconds, 30 seconds and 40 seconds from the steering angle sensor, and calculates an average value by dividing the sum of the five received steering angles by 5, which is the number of samples. The calculated average value is a driver's steering angle.

The target yaw rate computation unit 120 suitably calculates a front wheel steering angle that is used to obtain a target yaw rate from a driver's steering angle, which is calculated using the above-described method. In exemplary embodiments, the front wheel steering angle may be calculated using the following Equation 1:

$$\delta_f = \delta * \frac{\pi}{180} * GR \quad (1)$$

$\delta_f$: front steering angle (rad)

$\delta$: driver's steering angle (deg)

$GR$: gear ratio

The target yaw rate computation unit 120 suitably calculates a target yaw rate by solving the differential equation of the following Equation 2 based on first vehicle information and second vehicle information, which are suitably obtained using a front wheel steering angle, calculated from a driver's steering angle, and vehicle information, including vehicle behavior information and vehicle specification information. In the following Equation 2, the target yaw acceleration is a component that is suitably obtained by differentiating a target yaw rate:

$$\gamma'_d = -\frac{1}{T}\gamma_d + \frac{K}{T}\delta_f \quad (2)$$

$\gamma'_d$: target *yaw* acceleration (rad/s²)

$\gamma_d$: target *yaw* rate (rad/s)

$\delta_f$: front wheel steering angle (rad)

$K$: first vehicle information $T$: second vehicle information

The above-described first vehicle information K and second vehicle information T can be suitably obtained using vehicle behavior information and vehicle specification information included in the vehicle information. In preferred embodiments, the first and second vehicle information K and T can be obtained using, for example, but not limited to, the velocity of a vehicle, the mass of the vehicle, front wheel cornering power, rear wheel cornering power, the distance from the center of gravity of a vehicle to the front wheel of the vehicle, the distance from the center of gravity of the vehicle to the rear wheel of the vehicle, and the inertial moment of a steering system, which constitute vehicle information. In certain preferred embodiments, the first vehicle information can be suitably obtained using the following Equation 3, and the second vehicle information can be suitably obtained using the following Equation 4:

$$K = \frac{V}{(l_f + m*l_f*l_r*V^2)/(2C_f*l_f*(l_f+l_r))} \quad (3)$$

$$T = \frac{l_z*V}{2C_f*l_f*(l_f+l_r) + m*l_r*V^2} \quad (4)$$

V: speed of vehicle (m/s)
m: mass of vehicle (Kg)
$l_f$: distance from center of gravity of vehicle to front wheel (m)
$l_r$: distance from center of gravity of vehicle to rear wheel (m)
$l_z$: inertial moment of steering system (kg·m$^2$)
$C_f=2*K_f$, $K_f$: front wheel cornering power (N/rad)
$C_r=2*K_r$, $K_r$: rear wheel cornering power (N/rad)

Figure 2:
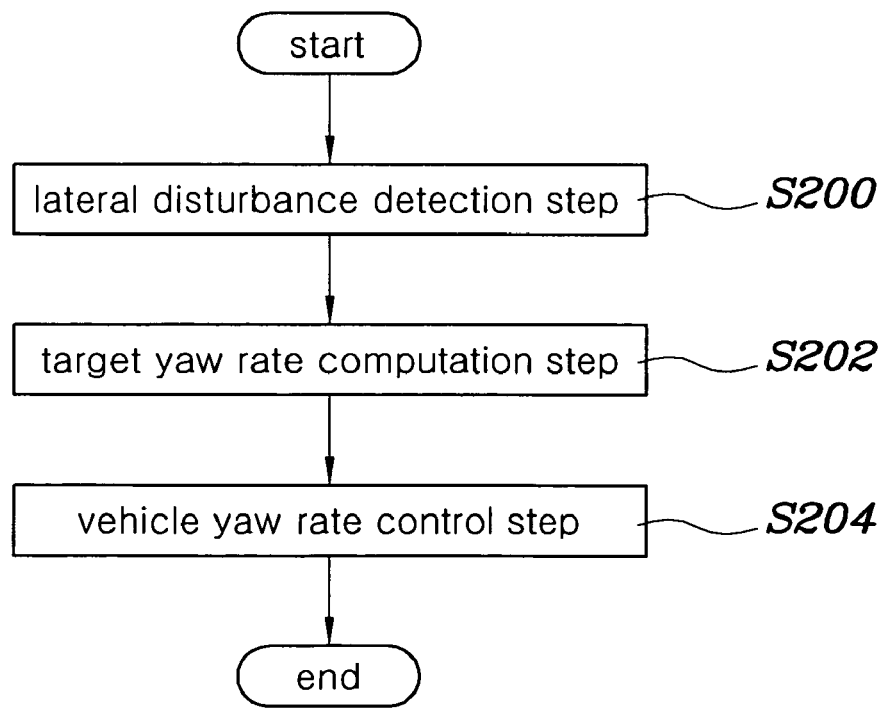
FIG. 2 is a flowchart of a method of controlling lateral stability according to the present invention.

FIG. 2 is a flowchart of a method of controlling lateral stability according to preferred aspects of the present invention.

As shown in FIG. 2, the lateral stability control method for stabilizing the behavior of a vehicle when a lateral disturbance occurs preferably includes a lateral disturbance detection step S200 of detecting a lateral disturbance, a target yaw rate computation step S202 of, when a lateral disturbance is detected, calculating a driver's steering angle and calculating a target yaw rate using the calculated driver's steering angle, and vehicle information including, but not limited to, vehicle behavior information and vehicle specification information, and a vehicle yaw rate control step S204 of controlling the vehicle yaw rate to attenuate a turning moment attributable to the lateral disturbance, thereby suitably causing the controlled vehicle yaw rate to converge on a previously calculated target yaw rate.

According to preferred embodiments of the invention, at the target yaw rate computation step S202, the above-described driver's steering angle is preferably calculated by extracting a number of steering angles equal to the number of samples, measured before the time point at which the lateral disturbance was detected at the lateral disturbance detection step S200, preferably at intervals of sampling periods using the steering angle sensor and calculating the average of the extracted number of steering angles equal to the number of samples.

The above-described vehicle information, including vehicle behavior information and vehicle specification information, includes, but is not limited to, the velocity of a vehicle, the mass of the vehicle, front wheel cornering power, rear wheel cornering power, the distance from the center of gravity of the vehicle to a front wheel, the distance from the center of gravity of the vehicle to a rear wheel, and the inertial moment of a steering system.

According to other preferred embodiments of the invention, at the target yaw rate computation step S202, a target yaw rate is obtained by establishing a differential equation, such as the above-described Equation 2, for the target yaw rate using the above-described driver's steering angle and vehicle information and solving the differential equation. The target yaw rate, obtained as described above, is information that may be suitably used as a reference to control the vehicle yaw rate at the vehicle yaw rate control step S204.

Figure 3:
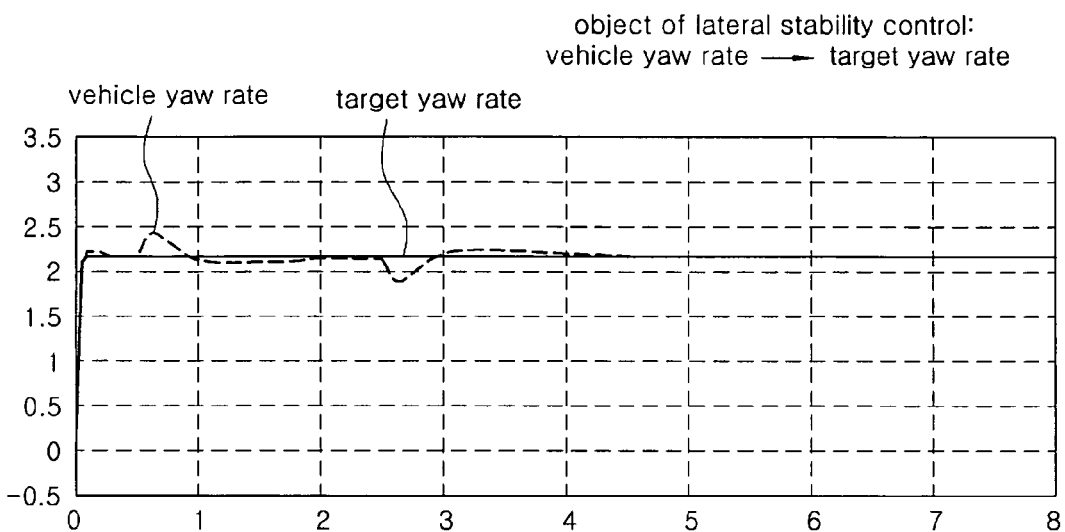
FIG. 3 is a simulation result graph showing the control of the vehicle yaw rate based on the application of the lateral stability control method when a lateral disturbance occurs.

FIG. 3 is a simulation result graph exemplifying the control of the vehicle yaw rate preferably based on the application of the lateral stability control method when a lateral disturbance occurs. With regard to lateral disturbance input conditions, a lateral disturbance was input for a suitable period from 0.5 seconds to 2.5 seconds, and a lateral force and a turning moment were generated due to the input lateral disturbance.

According to the present invention, the lateral stability control method is preferably a method for preventing a driver from moving off of an intended road due to a lateral force or a turning moment attributable to a lateral disturbance. This method suitably performs control in such a way as to attenuate a turning moment, generated by a yaw component attributable to a lateral disturbance, by controlling a vehicle yaw rate, thereby causing the vehicle yaw rate to converge on a target yaw rate required for traveling.

As exemplified in FIG. 3, it can be seen that the vehicle yaw rate converged on the calculated target yaw rate through the suitable application of the lateral stability control method according to the present invention. In preferred embodiments, the lateral stability control method according to the present invention performs control so that the vehicle yaw rate converges on the target yaw rate.

Figure 4A:
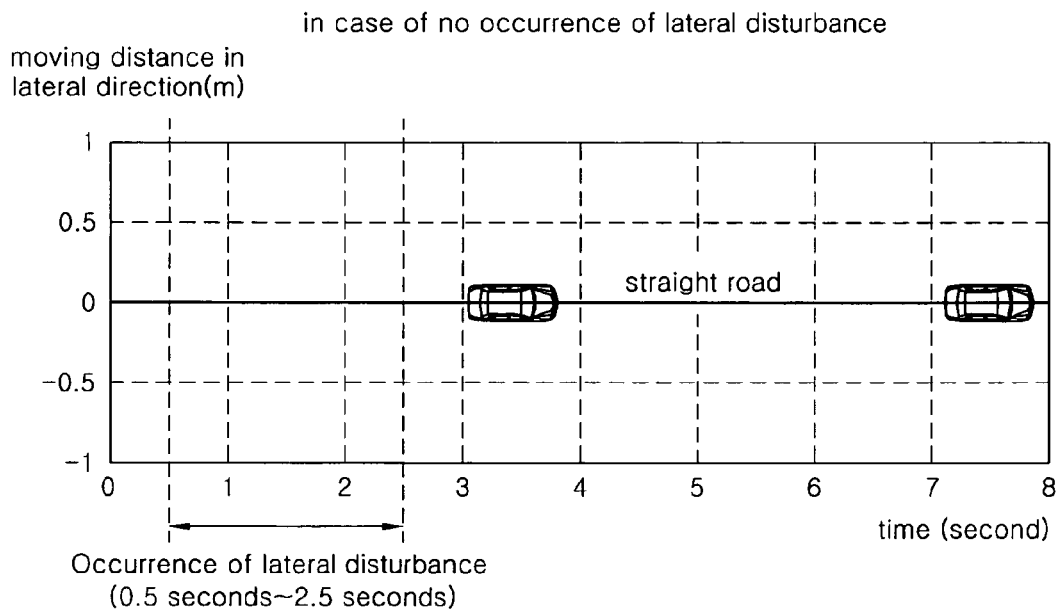
FIGS. 4A to 4C are simulation result graphs showing the comparison of the degree of movement in the case of the application of lateral stability control with the degree of movement in the case of no application of lateral stability control when a lateral disturbance occurs while a vehicle travels along a straight road.
Figure 4B:
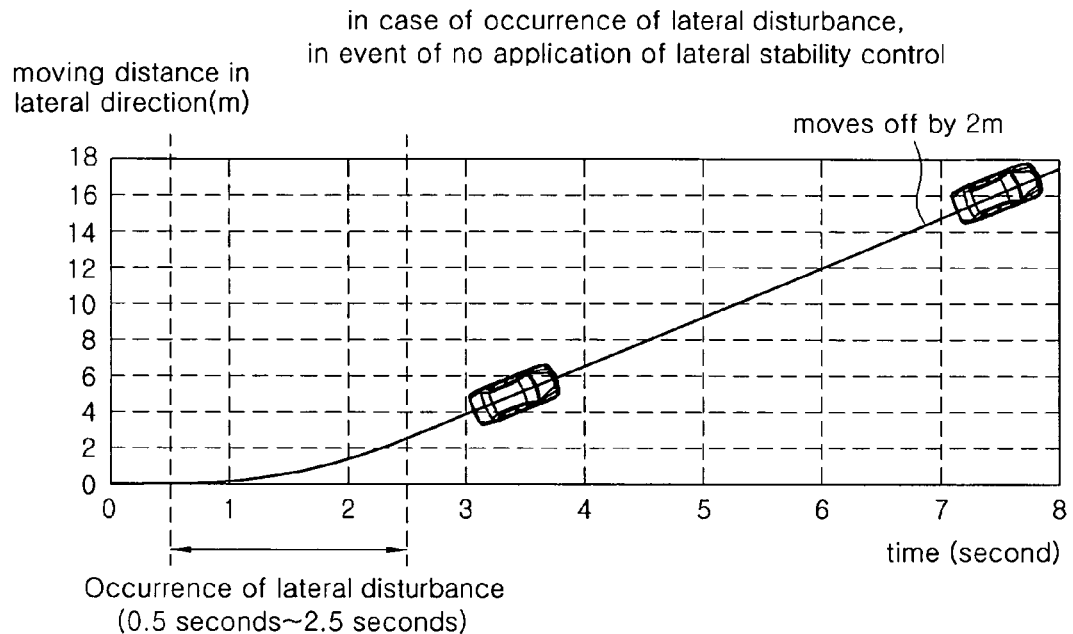
Figure 4C:
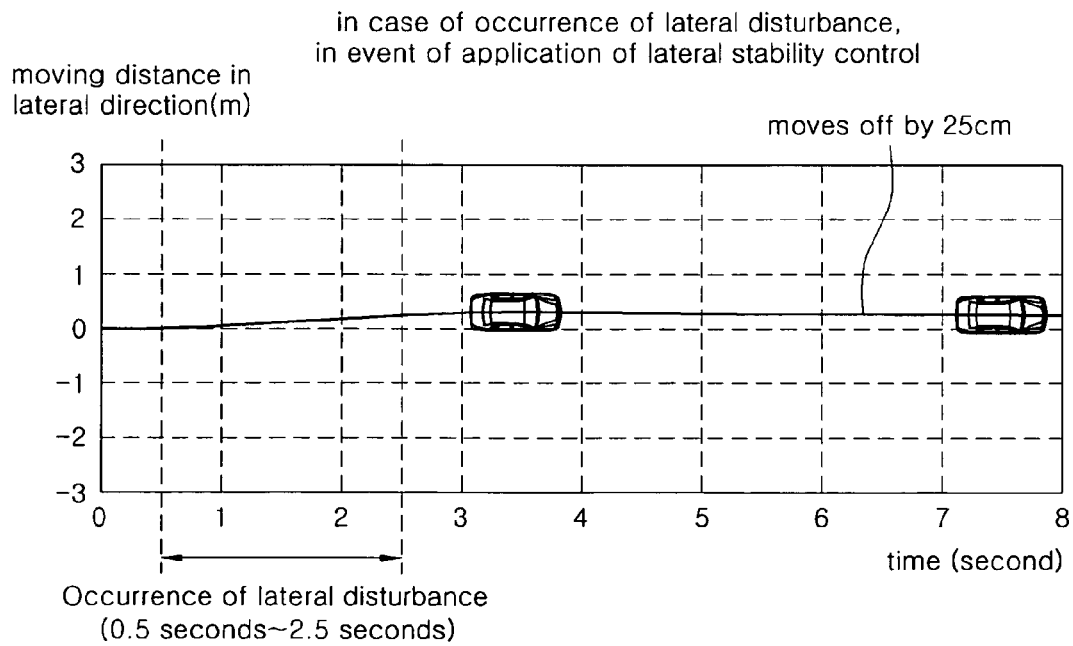

FIGS. 4A to 4C are exemplary simulation result graphs showing the comparison of the degree of movement in the case of the application of lateral stability control with the degree of movement in the case of no application of lateral stability control when a lateral disturbance occurs while a vehicle travels along a straight road.

FIG. 4A is a graph showing the exemplary behavior of a vehicle that travels along a straight road when a lateral disturbance does not occur, which is used as a reference to determine the degree of movement when a lateral disturbance occurs.

FIG. 4B is a graph showing the exemplary behavior of a vehicle to which lateral stability control was not applied because the lateral stability control apparatus was not provided therein when a lateral disturbance occurred for 2 seconds from 0.5 seconds to 2.5 seconds while the vehicle traveled along a straight road.

FIG. 4C is a graph showing the exemplary behavior of a vehicle to which lateral stability control was applied because the lateral stability control apparatus was provided therein when a lateral disturbance occurred for 2 seconds from 0.5 seconds to 2.5 seconds while the vehicle traveled along a straight road.

In FIGS. 4A, 4B and 4C, the horizontal axis of the graphs represents time, and the vertical axis thereof represents the moving distance of a vehicle in a lateral direction over time.

From FIG. 4A, it can be seen that the moving distance in the lateral direction over the entire time is 0 because a lateral disturbance suitably does not occur. This shows that a vehicle is traveling along the straight road in a normal state.

As exemplified in FIG. 4B, a vehicle not provided with the lateral stability control apparatus had moved in the lateral direction by a distance equal to or greater than 2 m at the point of 2.5 seconds, which came after a lateral disturbance duration of 2 seconds, due to the occurrence of the lateral disturbance, as compared to the vehicle in a normal state. In certain examples, such movement may cause a traffic accident.

In contrast, as exemplified in FIG. 4C, it can be seen that, when a lateral disturbance identical to that of FIG. 4B occurred, a vehicle provided with the lateral stability control apparatus moved in the lateral direction by a distance equal to or less than 25 cm at the point of 2.5 seconds, as compared to the vehicle in a normal state. Thus, comparing a vehicle provided with the lateral stability control apparatus as exemplified in FIG. 4C to a vehicle not provided with the lateral stability control apparatus as exemplified in FIG. 4B, the moving distance is reduced in FIG. 4C by 2 m as compared to FIG. 4B.

Accordingly, the lateral stability control apparatus, provided in a vehicle that travels along a straight road, suitably controls a vehicle yaw rate so as to attenuate a turning moment attributable to a lateral disturbance when the lateral disturbance occurs, thereby preventing the vehicle from moving off of an intended road and preventing the occurrence and danger of a traffic accident.

Figure 5A:
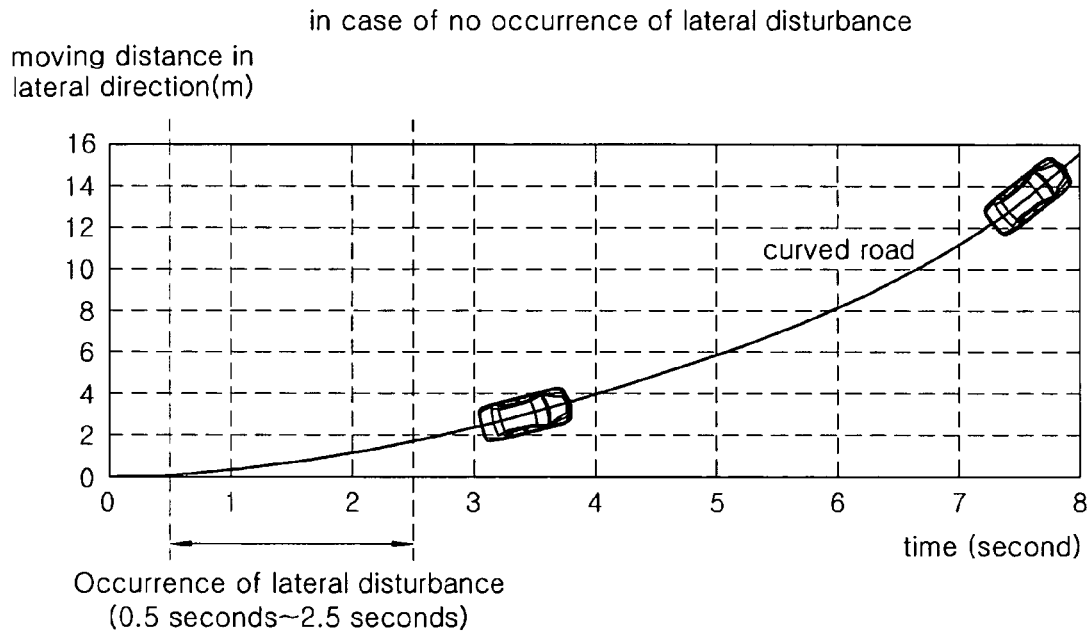
FIGS. 5A to 5C are simulation result graphs showing the comparison of the degree of movement in the case of the application of lateral stability control with the degree of movement in the case of no application of lateral stability control when a lateral disturbance occurs while a vehicle travels along a curved road.
Figure 5B:
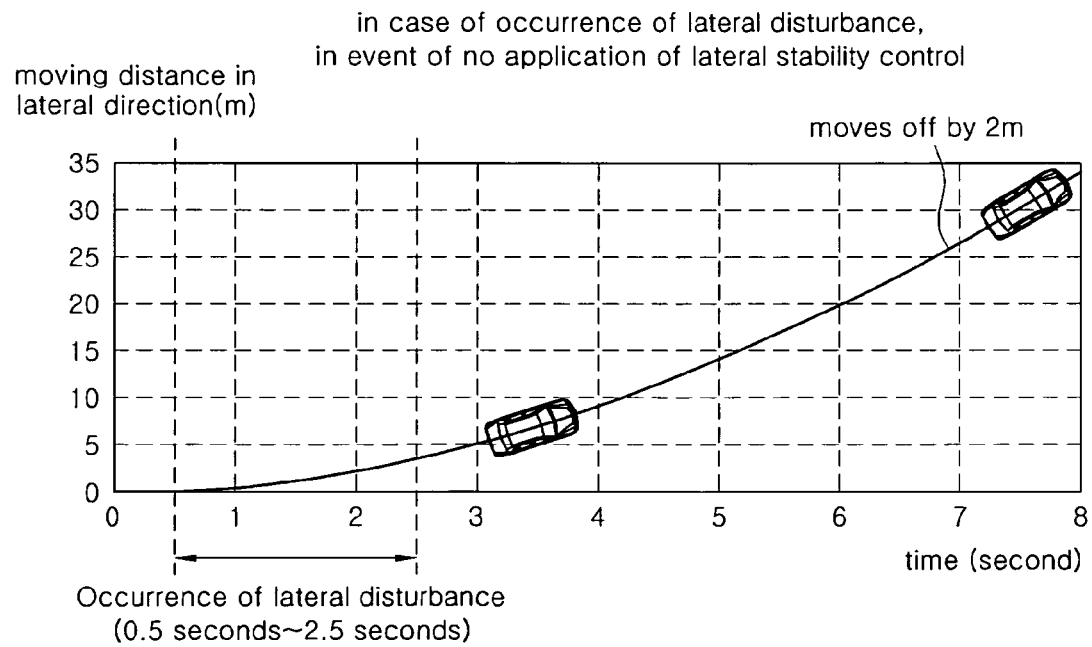
Figure 5C:
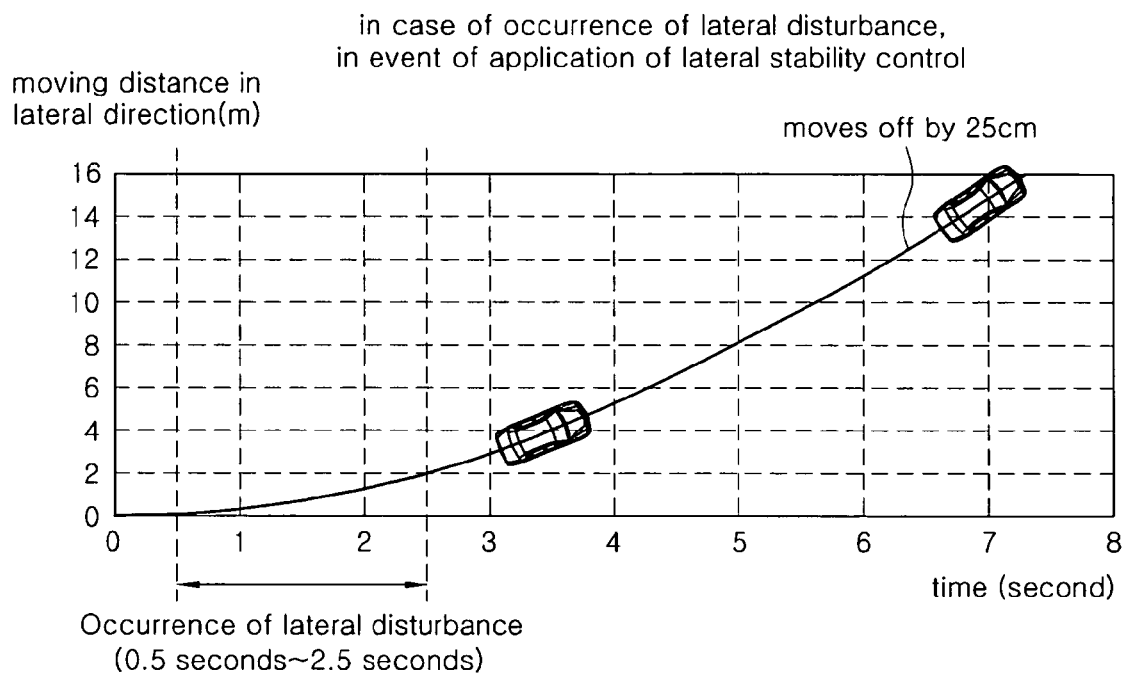

FIGS. 5A to 5C are simulation result graphs showing the comparison of the degree of movement in the case of the application of lateral stability control with the degree of movement in the case of no application of lateral stability control when a lateral disturbance suitably occurs while a vehicle travels along a curved road.

FIG. 5A is a graph showing the behavior of a vehicle that travels along a curved road when a lateral disturbance does not occur, which is used as a reference to determine the degree of movement when a lateral disturbance suitably occurs.

FIG. 5B is a graph showing the behavior of a vehicle to which lateral stability control was not applied because the lateral stability control apparatus was not provided therein when a lateral disturbance suitably occurred for 2 seconds from 0.5 seconds to 2.5 seconds while the vehicle traveled along a curved road.

FIG. 5C is a graph showing the behavior of a vehicle to which lateral stability control was applied because the lateral stability control apparatus was provided therein when a lateral disturbance suitably occurred for 2 seconds from 0.5 seconds to 2.5 seconds while the vehicle traveled along a curved road.

In FIGS. 5A, 5B and 5C, the horizontal axis of the graphs represents time, and the vertical axis thereof represents the moving distance of a vehicle in a lateral direction over time.

FIG. 5A shows the normal travel of a vehicle over the entire time. From this drawing, it can be seen that the moving distance of the vehicle in the lateral direction was 0 m at the point of 0 seconds and that the moving distance of the vehicle in the lateral direction was about 1.5 m at the point of 2.5 seconds.

As exemplified in FIG. 5B, a vehicle not provided with the lateral stability control apparatus moved in the lateral direction by a distance of 4 m, which is about 2 m more than 1.5 m in a normal state, at the point of 2.5 seconds, which came after a lateral disturbance duration of 2 seconds, due to the occurrence of the lateral disturbance, compared to the vehicle in a normal state. Such movement may suitably cause a traffic accident.

In contrast, as exemplified in FIG. 5C, it can be seen that, although a lateral disturbance identical to that of FIG. 5B occurred, a vehicle provided with the lateral stability control apparatus had moved in the lateral direction by a distance of 1.7 m, which is about 25 cm more than 1.5 m in a normal state, at the point of 2.5 seconds, compared to the vehicle in a normal state. That is, it can be seen that the moving distance was suitably very short. This means that the moving distance is suitably reduced compared to 2 m in FIG. 4B.

Accordingly, the lateral stability control apparatus, provided in a vehicle, controls the vehicle yaw rate so as to attenuate the turning moment attributable to a lateral disturbance when the lateral disturbance occurs in a curved road as well as the straight road of FIG. 4, so that the lateral stability control apparatus has advantages of preventing the vehicle from moving off of the road and preventing the occurrence and danger of a traffic accident.

The above-described invention has an advantage in that the vehicle yaw rate is controlled so as to attenuate the turning moment attributable to a lateral disturbance when the lateral disturbance occurs, thereby preventing the vehicle from suitably moving off of the road and preventing the occurrence and danger of a traffic accident.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for controlling lateral stability of a vehicle, the apparatus stabilizing behavior of the vehicle when a lateral disturbance occurs, comprising:
  a lateral disturbance detection unit configured to detect a lateral disturbance;
  a target yaw rate computation unit configured to calculate a driver's steering angle when the lateral disturbance is detected, and calculating a target yaw rate using the calculated driver's steering angle, and vehicle information, including vehicle behavior information and vehicle specification information wherein the target yaw rate computation unit is configured to calculate the driver's steering angle by extracting a number of steering angles equal to a number of samples, measured before a time point at which the lateral disturbance was detected, at intervals of sampling periods and calculate an average of the number of steering angles equal to the number of samples; and
  a vehicle yaw rate control unit configured to control a vehicle yaw rate so as to attenuate a turning moment attributable to the lateral disturbance, thereby causing the controlled vehicle yaw rate to converge on the calculated target yaw rate.

2. The apparatus as set forth in claim 1, wherein the lateral disturbance detection unit detects the lateral disturbance using a yaw rate sensor.

3. The apparatus as set forth in claim 1, wherein the target yaw rate computation unit calculates the driver's steering angle using a steering angle sensor.

4. The apparatus as set forth in claim 1, wherein the target yaw rate computation unit obtains the target yaw rate by solving the following differential equation based on a front wheel steering angle, calculated using the calculated driver's steering angle, and first vehicle information and second vehicle information obtained using the vehicle information:

$$\gamma'_d = -\frac{1}{T}\gamma_d + \frac{K}{T}\delta_f$$

$\gamma'_d$: target yaw acceleration (rad/s$^2$)

$\gamma_d$: target yaw rate (rad/s)

$\delta_f$: front wheel steering angle (rad)

$K$: first vehicle information $T$: second vehicle information.

5. The apparatus as set forth in claim 4, wherein the first vehicle information K and the second vehicle information T are obtained using velocity of the vehicle, mass of the vehicle, front wheel cornering power, rear wheel cornering power, a distance from a center of gravity of the vehicle to the front wheel of the vehicle, the distance from the center of gravity of the vehicle to a rear wheel of the vehicle and an inertial moment of a steering system.

6. A method of controlling lateral stability of a vehicle, the method stabilizing behavior of the vehicle when a lateral disturbance occurs, comprising:
   detecting a lateral disturbance by (a) a lateral disturbance detection unit;
   calculating a driver's steering angle when the lateral disturbance is detected, and calculating a target yaw rate using the calculated driver's steering angle, and vehicle information, including vehicle behavior information and vehicle specification information by a target yaw rate computation unit, wherein the target yaw rate computation unit further (i) calculates the driver's steering angle by extracting a number of steering angles equal to a number of samples, measured before a time point at which the lateral disturbance was detected, at intervals of sampling periods and (ii) calculates an average of the number of steering angles equal to the number of samples; and
   controlling, by a vehicle yaw rate control unit, a vehicle yaw rate so as to attenuate a turning moment attributable to the lateral disturbance, thereby causing the controlled vehicle yaw rate to converge on the calculated target yaw rate.

7. The method as set forth in claim 6, wherein the vehicle information comprises velocity of the vehicle, mass of the vehicle, front wheel cornering power, rear wheel cornering power, a distance from a center of gravity of the vehicle to the front wheel of the vehicle, the distance from the center of gravity of the vehicle to a rear wheel of the vehicle and an inertial moment of a steering system.

8. An apparatus for controlling lateral stability of a vehicle, the apparatus stabilizing behavior of the vehicle when a lateral disturbance occurs, comprising:
   a lateral disturbance detection unit for detecting a lateral disturbance, wherein the lateral disturbance detection unit detects the lateral disturbance using a yaw rate sensor;
   a target yaw rate computation unit for calculating a driver's steering angle when the lateral disturbance is detected using a steering angle sensor, wherein the target yaw rate computation unit further (i) calculates a driver's steering angle by extracting a number of steering angles equal to a number of samples, measured before a time point at which the lateral disturbance was detected, at intervals of sampling periods and (ii) calculates an average of the number of steering angles equal to the number of samples; and
   a vehicle yaw rate control unit for controlling a vehicle yaw rate so as to attenuate a turning moment attributable to the lateral disturbance.

9. The apparatus for controlling lateral stability of a vehicle of claim 8, whereby the vehicle yaw rate control unit further causes the controlled vehicle yaw rate to converge on the calculated target yaw rate.

10. The apparatus for controlling lateral stability of a vehicle according to claim 8, wherein vehicle information includes vehicle behavior information and vehicle specification information.

11. A motor vehicle comprising an apparatus for controlling lateral stability of a vehicle, the apparatus further comprising:
   a lateral disturbance detection unit for detecting a lateral disturbance;
   a target yaw rate computation unit for calculating a driver's steering angle when the lateral disturbance is detected, and calculating a target yaw rate using the calculated driver's steering angle, and vehicle information, including vehicle behavior information and vehicle specification information, wherein the target yaw rate computation unit further (i) calculates the driver's steering angle by extracting a number of steering angles equal to a number of samples, measured before a time point at which the lateral disturbance was detected, at intervals of sampling periods and (ii) calculates an average of the number of steering angles equal to the number of samples; and
   a vehicle yaw rate control unit for controlling a vehicle yaw rate so as to attenuate a turning moment attributable to the lateral disturbance, thereby causing the controlled vehicle yaw rate to converge on the calculated target yaw rate.

12. A motor vehicle comprising an apparatus for controlling lateral stability of a vehicle, the apparatus further comprising:
   a lateral disturbance detection unit for detecting a lateral disturbance, wherein the lateral disturbance detection unit detects the lateral disturbance using a yaw rate sensor;
   a target yaw rate computation unit for calculating a driver's steering angle when the lateral disturbance is detected using a steering angle sensor, wherein the target yaw rate computation unit further (i) calculates a driver's steering angle by extracting a number of steering angles equal to a number of samples, measured before a time point at which the lateral disturbance was detected, at intervals of sampling periods and (ii) calculates an average of the number of steering angles equal to the number of samples; and
   a vehicle yaw rate control unit for controlling a vehicle yaw rate so as to attenuate a turning moment attributable to the lateral disturbance.

* * * * *